US011434076B2

(12) United States Patent
Rogers

(10) Patent No.: US 11,434,076 B2
(45) Date of Patent: Sep. 6, 2022

(54) WIRELESS CARGO MANIFEST TRACKER AND HAZARD PROTECTION SYSTEM

(71) Applicant: Kidde Technologies, Inc., Wilson, NC (US)

(72) Inventor: Aaron Stanley Rogers, Surf City, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 181 days.

(21) Appl. No.: 16/816,383

(22) Filed: Mar. 12, 2020

(65) Prior Publication Data

US 2021/0284449 A1 Sep. 16, 2021

(51) Int. Cl.
*G06F 7/00* (2006.01)
*B65G 1/137* (2006.01)
*G05B 15/02* (2006.01)
*G06K 19/07* (2006.01)

(52) U.S. Cl.
CPC .......... *B65G 1/1373* (2013.01); *G05B 15/02* (2013.01); *G06K 19/0723* (2013.01); *B65G 2203/046* (2013.01)

(58) Field of Classification Search
CPC .......... B65G 1/1373; B65G 2203/046; G05B 15/02; G06K 19/0723; G06Q 10/087; B64D 45/00; B64D 9/00; B64D 2045/0075
USPC .............................. 700/11, 17, 28, 213, 215
See application file for complete search history.

(56) References Cited

U.S. PATENT DOCUMENTS

| 8,427,290 | B2 | 4/2013 | Davis et al. |
| 9,248,917 | B2 | 2/2016 | Gastonides et al. |
| 9,472,079 | B2 | 10/2016 | Meier |
| 9,796,480 | B2 | 10/2017 | Stehman et al. |
| 2009/0102660 | A1* | 4/2009 | Evans ................. G01S 5/0294 340/572.1 |
| 2010/0100225 | A1* | 4/2010 | Reed ..................... B64D 9/00 701/124 |
| 2021/0240204 | A1* | 8/2021 | Laughlin ............ B64D 25/12 |

FOREIGN PATENT DOCUMENTS

| EP | 2546673 A2 * | 1/2013 | ........... G01S 5/0294 |
| EP | 2546673 A2 | 1/2013 | |

OTHER PUBLICATIONS

Search Report for European Application No. 21162338.4 dated Jul. 7, 2021, 6 pages.

* cited by examiner

*Primary Examiner* — Yolanda R Cumbess
(74) *Attorney, Agent, or Firm* — Cantor Colburn LLP

(57) ABSTRACT

Provided are embodiments of a method for operating a hazard protection system. The method includes reading a tag coupled to a pallet storing cargo, determining a cargo type of the cargo, and initializing a configuration of parameters for the multi-parameter sensor based on the cargo type. The method also includes monitoring a cargo hold storing the cargo based at least in part on the initialized configuration of the multi-parameter sensor, and displaying the cargo type and hazard definition. Also provided are embodiments for a hazard protection system.

13 Claims, 3 Drawing Sheets

WIRELESS CARGO MANIFEST TRACKER AND HAZARD PROTECTION SYSTEM

BACKGROUND

The present invention relates to protection systems, and more specifically, to a wireless cargo manifest tracker and hazard protection system.

Aircraft are used to efficiently transport cargo long distances. Aircraft are capable of transporting a wide range of large and small items. As the cargo is loaded in the storage area, the items are manually recorded by an operator in a cargo manifest. The cargo manifest maintains a list of the cargo that is installed on the pallets prior to loading onto the aircraft, along with information such as the weight of the cargo. This allows the operator and/or pilot to track the items that are transported during flight.

BRIEF DESCRIPTION

According to an embodiment, a hazard protection system is provided. The system includes a tagging and tracking system comprising a tag coupled to a pallet storing cargo; a multi-parameter sensor that is located in a zone of a cargo hold, wherein the multi-parameter sensor is configured to monitor a plurality of conditions of the cargo hold; a controller configured to wirelessly communicate with the tag to determine a cargo type of the cargo and initialize a configuration of the multi-parameter sensor based on the cargo type; and an electronic flight bag configured to display cargo type and hazard definition.

In addition to one or more of the features described herein, or as an alternative, further embodiments include a controller that is configured to modify the initial configuration of the multi-parameter sensor based at least in part on the cargo type.

In addition to one or more of the features described herein, or as an alternative, further embodiments include modifying the initial configuration of the multi-parameter sensor comprises increasing or decreasing a sensitivity of the multi-parameter sensor based at least in part on the cargo type.

In addition to one or more of the features described herein, or as an alternative, further embodiments include a controller that is located in a position proximate to an entrance of the cargo hold to automatically read the tag as it enters the cargo hold.

In addition to one or more of the features described herein, or as an alternative, further embodiments include a plurality of multi-parameter sensors, wherein each of the plurality of multi-parameter sensors are independently configurable from other multi-parameter sensors in the cargo hold.

In addition to one or more of the features described herein, or as an alternative, further embodiments include using a plurality of multi-parameter sensors that monitor parameters associated with a heat sensitivity, a smoke sensitivity, or a gas sensitivity.

In addition to one or more of the features described herein, or as an alternative, further embodiments include a tag that is a radio-frequency identification (RFID) tag, wherein the RFID tag is placed on the pallet.

In addition to one or more of the features described herein, or as an alternative, further embodiments include an electronic flight bag including a display configured to display a cargo manifest including a tag ID, the cargo type, and hazard definition corresponding to the cargo type.

According to an embodiment, a method for operating a hazard protection system is provided. The method includes reading a tag coupled to a pallet storing cargo; determining a cargo type of the cargo; initializing a configuration of parameters for the multi-parameter sensor based on the cargo type; monitoring a cargo hold storing the cargo based at least in part on the initialized configuration of the multi-parameter sensor; and displaying the cargo type and hazard definition.

In addition to one or more of the features described herein, or as an alternative, further embodiments include parameters that include at least heat, smoke, and gas.

In addition to one or more of the features described herein, or as an alternative, further embodiments include modifying the initial configuration of the multi-parameter sensor based at least in part on the cargo type.

In addition to one or more of the features described herein, or as an alternative, further embodiments include modifying the initial configuration of the multi-parameter sensor to increase or decrease a sensitivity of the multi-parameter sensor based at least in part on the cargo type.

In addition to one or more of the features described herein, or as an alternative, further embodiments include reading the tag at a position proximate to an entrance of the cargo hold to automatically read the tag as it enters the cargo hold.

In addition to one or more of the features described herein, or as an alternative, further embodiments include configuring a plurality of multi-parameter sensors, wherein each of the plurality of multi-parameter sensors is independently configurable from other multi-parameter sensors in the cargo hold.

In addition to one or more of the features described herein, or as an alternative, further embodiments include a plurality of multi-parameter sensors that monitor parameters associated with a heat sensitivity, a smoke sensitivity, or a gas sensitivity.

In addition to one or more of the features described herein, or as an alternative, further embodiments include a tag that is a radio-frequency identification (RFID) tag, wherein the RFID tag is placed on the pallet.

In addition to one or more of the features described herein, or as an alternative, further embodiments include displaying a cargo manifest including a tag ID, the cargo type, and hazard definition corresponding to the cargo type.

In addition to one or more of the features described herein, or as an alternative, further embodiments include using a sequence in which a plurality of tags corresponding to respective pallets is read to define a position of the pallets in the cargo hold.

Technical effects of embodiments of the present disclosure include optimizing the sensor configuration based on the cargo type.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Currently large commercial aircraft utilize single parameter, single threshold smoke detectors to monitor and protect the cargo holds. For example, the detectors are designed to detect smoke particulates from small smoldering fires and are calibrated during manufacturing. These detectors provide a single detection level of smoke for its applications. That is, current detectors offer a one-size-fits-all or a single universal solution for all applications without the option to specifically modify the setting of the detectors based on the application.

Various types of cargo such as lithium-ion batteries can pose a hazard during flight. The single parameter, single threshold smoke detector is not optimized to detect hazards caused by this type of cargo but is instead generally configured to detect a range of hazards. Therefore, a number of different types of detectors may be required to detect different hazards according to current solutions.

Additionally, the cargo manifests are manually tracked on the basis of the cargo loaded onto the pallets prior to being placed onto the aircraft, which oftentimes results in cargo manifest mismatches and errors including cargo that could present special hazards as well as incorrect cargo weights and center of gravity positioning on board the aircraft.

Since the cargo holds are not accessible during flight early detection of hazards originating in the cargo hold is critical. The pilots are not able to physically monitor the cargo during flight, during an event, there may be a delay in detecting the condition associated with the event. This can lead to an even further delay in responding to the potentially hazardous condition.

The techniques described herein provide for early detection of these hazards by fine-tuning the configuration of the sensors/detectors to optimally detect the hazard based on the type of cargo being stored and its physical location on board the aircraft. The techniques described herein provide for a wireless cargo manifest tracking and hazard protection system that is optimized for the cargo that is loaded onto the aircraft. The information associated with the cargo is captured wirelessly, categorized by hazard threat, with the information shared to the cargo hold smoke detection system to permit dynamically adaptable multi-parameter sensor thresholds, with the information also provided to the cockpit electronic flight bags for the pilot/co-pilot knowledge and considerations including but not limited to; hazardous cargo transport quantity restrictions, cargo weight and center of gravity positioning on board the aircraft.

Figure 1:
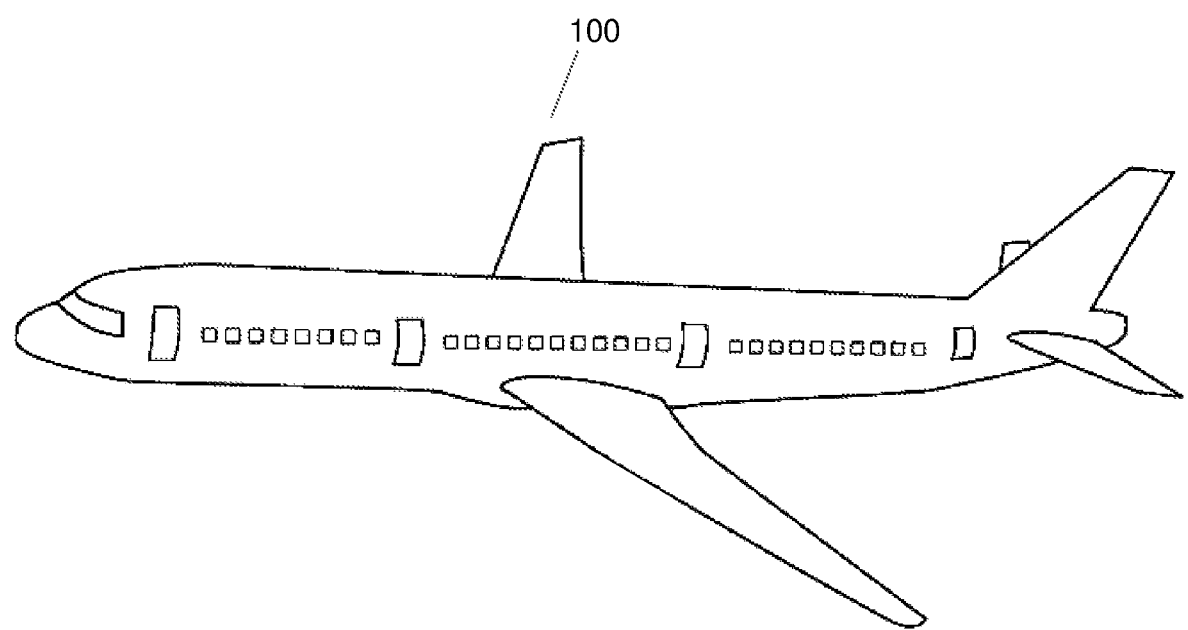
FIG. 1 depicts an aircraft in accordance with one or more embodiments of the disclosure.

FIG. 1 depicts an aircraft 100 in accordance with one or more embodiments of the disclosure. Although the description references the cargo hold 110 of an aircraft it should be understood that the techniques and systems described herein can be applied to cargo holds or storage areas of other vehicles or structures, such as but not limited to ships, warehouses, etc.

Figure 2:
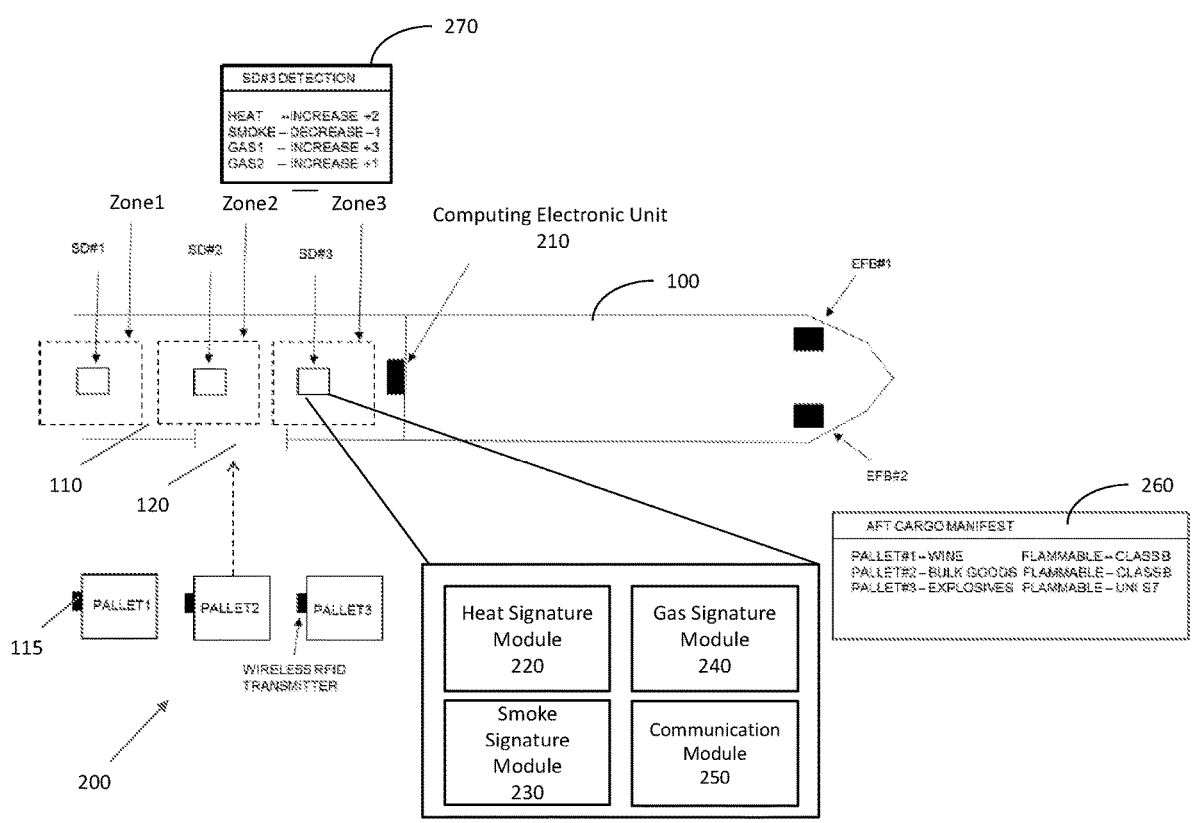
FIG. 2 depicts a system in an aircraft in accordance with one or more embodiments of the disclosure.

FIG. 2 depicts a hazard protection system 200 in accordance with one or more embodiments of the disclosure. In one or more embodiments, the hazard protection system 200 is implemented into an aircraft 100 such as that shown in FIG. 1. The hazard protection system 200 includes a plurality of systems such as the wireless cargo identification tagging and tracking system, a multi-sensor detector system, and an electronic flight bag system.

The wireless cargo identification tagging and tracking system (RFID) includes RFID tags 115. In one or more embodiments of the disclosure, each RFID tag is affixed to a pallet. The information is recorded and stored on a centralized Cargo Electronics Unit (CEU 210). The CEU 210 records an entry for each pallet as it passes through the cargo entrance 120 and loaded onto the aircraft. A scanner/reader can be located near the cargo entrance to automatically read the RFID of the pallets.

The information that is associated with the RFID can include information such as but not limited to the position of the pallet in the cargo area, the weight, the hazard definition of the cargo of the pallet, etc. The information can be stored in a memory of the CEU. In one or more embodiments of the disclosure the memory is configured to store the cargo manifest information (as shown in FIG. 2).

The multi-sensor detector system includes a plurality of multi-parameter sensors SD #1, SD #2, and SD #3. The multi-parameter sensors SD #1, SD #2, and SD #3 can adaptively adjust the sensor parameters and thresholds to the specific cargo loaded into the aircraft as well as verify its physical location via wireless communication and/or optical position sensing. During flight, the parameters that are monitored by the multi-sensor detectors include heat, smoke, and gas. The thresholds for heat, smoke, and gas define the sensitivity that each respective condition is detected. The thresholds can be configured by the CEU 210.

In a non-limiting example, each sensor includes a heat signature module 220, a smoke signature module 230, and a gas signature module 240. In one or more embodiments of the disclosure, each of the sensors can be tuned or configured to detect a certain condition by modifying the signatures that are observed by the sensors. The signatures can be individually modified to increase/decrease the sensors' sensitivity to one or more conditions (heat, smoke, gas, etc.).

It should be understood that other types of modules can be included in the multi-parameter sensors SD #1, SD #2, and SD #3. Each of the modules can be configured to optimally detect the respective conditions. The multi-parameter sensors SD #1, SD #2, and SD #3 are located in the vicinity of the cargo holds. In a non-limiting example, the multi-parameter sensors SD #1, SD #2, and SD #3 are located above the area or zone in which the pallets are stored in the cargo hold.

The multi-parameter sensors SD #1, SD #2, and SD #3 also include a communication module 250 to communicate with a controller such as the CEU 210. The communication module 250 can receive the configuration information from the CEU 210 and transmit status/condition/alarm information to the CEU 210.

As shown in FIG. 2, pallet #1 is positioned in Zone 1. The multi-parameter sensor SD #1 monitors Zone 1 of the cargo hold. The sensor SD #2 monitors the Zone 2 where pallet #2 is positioned, and the sensor SD #3 monitors the Zone 3 where pallet #3 is positioned.

The hazard protection system 200 also includes an electronic flight bag EFB #1 and EFB #2. The electronic flight bags are located in the cockpit of the aircraft and receive the cargo manifest information from the CEU 210. As shown there is a first electronic flight bag EFB #1 and EFB #2.

In some embodiments of the disclosure, the electronic flight bags EFB #1 and EFB #2 include displays which can be used to provide information to the pilot and co-pilot. The electronic flight bags can display information related to navigational charts, aircraft operating manuals, flight crew operating manuals, etc. In addition, electronic flight bags can provide information related to weather reports, airport information, delay information, etc. The pilot and co-pilot can have respective electronic flight bag displays or share a common electronic flight bag.

In one or more embodiments of the disclosure, the electronic flight bag is now configured to display information related to the cargo manifest. The information can include the type of cargo, the type of risk associated with the cargo, the location of the cargo in the cargo hold, the sensor(s) and location in the cargo hold, the sensor parameters, etc.

The information provided on the display of the electronic flight bag EFB #1 and EFB #2 categorizes the cargo by a hazard ranking for the pilot/co-pilot's information. The hazard definitions and rankings criteria can be defined using internationally recognized industry hazard standards such as those defined by the FAA, U.S. CFRs, NFPA, U.S. DOT and others.

The hazard definition defines the type of potential hazards, such as the flammability of the cargo. In a non-limiting example shown in FIG. 2, the flammability of each of the cargo units are defined as a flammability class such as class B, UNI S7. As shown in FIG. 2, the example manifest 260 provides the contents of pallet #1 include wine and its hazard definition is "Flammable—Class B." The contents of pallet #2 are bulk goods and its hazard definition is also "Flammable—Class B." The contents of pallet #3 are explosives and its hazard definition is "Flammable—UNI S7," which indicates a heightened type of risk. Therefore, the sensor SD #3 that monitors the zone where the pallet #3 is stored can be optimized to monitor for conditions associated with this type of risk/hazard.

In a non-limiting example, the configuration 270 includes the parameters and thresholds for sensor SD #3 are configured after reading the RFID associated with the contents of the pallet #3. The CEU transmits a configuration signal to the sensors based on the contents associated with the RFIDs. For SD #3, the heat sensitivity is increased by +2, the smoke sensitivity is decreased by −2, the first type of gas is increased by +3, and the second type of gas is increased by +1. The configuration is a non-limiting example and is provided only as an illustration.

Although only 3 pallets and 3 multi-parameter sensors are shown, it should be understood that any number of pallets and sensors of various dimensions can be used in the cargo hold and is not limited by the example shown in FIG. 2. Various types of cargo pose different types of risks and the techniques described herein can optimize the sensor configurations based on the cargo that is being transported.

Figure 3:
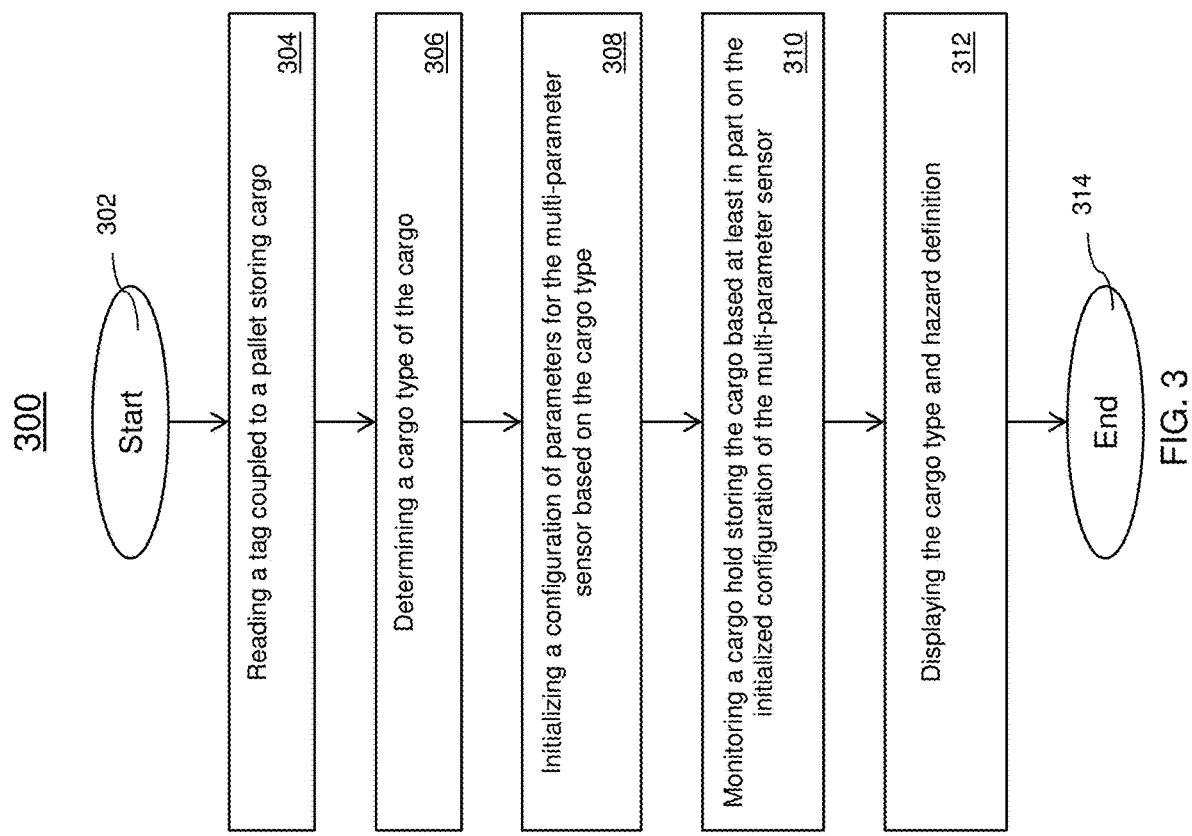
FIG. 3 depicts a flowchart of a method for operating wireless cargo manifest tracker and hazard protection in accordance with one or more embodiments of the disclosure.

FIG. 3 depicts a flowchart of a method 300 for operating a hazard protection system in accordance with one or more embodiments of the disclosure. The method 300 begins at block 302 and proceeds to block 304 which provides for reading, via a controller, a tag coupled to a pallet storing cargo. In one or more embodiments of the disclosure, an RFID reader/scanner is configured to read an RFID tag. The tag may be affixed to a cargo pallet that carries a certain type of cargo. The information associated with the RFID tag can also include the weight and position of the pallet. Block 306 determines the cargo type for the cargo. For example, the cargo type can indicate various levels of flammability. In other embodiments, the cargo type can indicate whether a hazardous condition such as a type of cargo that can generate excess smoke, excess heat, harmful gas, etc. Block 308 initializes a configuration of parameters for the multi-parameter sensor based on the cargo type. The multi-parameter sensors that are in the vicinity of the cargo can fine-tune the sensitivities of the sensors based at least in part on the cargo. Block 310 monitors a cargo hold storing the cargo based at least in part on the initialized configuration of the multi-parameter sensor. The sensors can efficiently and quickly detect a hazard based on the optimized configuration. Block 312 displays the cargo type and hazard definition. The pilot and co-pilot of the aircraft will be aware of the status of the cargo during flight. The method 300 ends at block 314, however, it should be understood that different steps can be included and FIG. 3 is not intended to limit the scope of the disclosure.

The technical effects and benefits include tuning the sensitivity of each of the sensors according to the type of cargo stored in the particular region. Also, the technical effects and benefits include providing a manifest corresponding to the type of cargo/risk and the location the cargo is stored.

By optimizing and fine tuning the sensitivity of the sensors for each zone of the cargo hold based on the cargo, the safety of the crew is increased by efficiently identifying potential harm. In addition, damage to other nearby cargo may be mitigated by the early detection of any hazardous conditions. The technical effects and benefits include synthesizing the independent systems, including the RFID system, the detection system, and the electronic flight bag system, to optimize the aircraft hazard protection system for various cargo hazards.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hazard protection system of an aircraft, comprising:
    a tagging and tracking system comprising a tag coupled to a pallet that stores cargo in a cargo hold of the aircraft;
    a multi-parameter sensor that is located in a zone of the cargo hold, wherein the multi-parameter sensor is configured to monitor a plurality of conditions of the cargo hold, including heat, smoke, and gas;
    a controller configured to wirelessly communicate with the tag to determine cargo parameters, including: a cargo type of the cargo; a location of the pallet in the cargo hold; a weight of the cargo on the pallet and a hazard definition of the cargo on the pallet,
    wherein the hazard definition includes a flammability classification of the cargo, and the controller is configured to initialize a configuration of the multi-parameter sensor based on the cargo parameters;
    wherein the controller is configured to modify the initial configuration, including increasing or decreasing sensitivity thresholds to heat, smoke and gas, of the multi-parameter sensor based on the cargo parameters; and
    an electronic flight bag configured to communicate with the controller and display a cargo manifest, the cargo parameters and the location of the sensor.

2. The system of claim 1, wherein the controller is located in a position proximate to an entrance of the cargo hold to automatically read the tag as it enters the cargo hold.

3. The system of claim 1, further comprising a plurality of multi-parameter sensors, wherein each of the plurality of multi-parameter sensors are independently configurable from other multi-parameter sensors in the cargo hold.

4. The system of claim 3, wherein the plurality of multi-parameter sensors monitor parameters associated with a heat sensitivity, a smoke sensitivity, or a gas sensitivity.

5. The system of claim 1, wherein the tag is a radio-frequency identification (RFID) tag, wherein the RFID tag is placed on the pallet.

6. The system of claim 1, wherein the electronic flight bag comprises a display configured to display a cargo manifest including a tag ID, the cargo type, and hazard definition corresponding to the cargo type.

7. A method for operating a hazard protection system of an aircraft, the method comprising:
    reading, via a system controller, a tag coupled to a pallet storing cargo in a cargo hold of the aircraft;
    determining, via the system controller, cargo parameters of the cargo, including: a cargo type of the cargo; a location of the pallet in the cargo hold; a weight of the cargo on the pallet and a hazard definition of the cargo on the pallet, wherein the hazard definition includes a flammability classification of the cargo;
    initializing, via the system controller, a configuration of parameters for a multi-parameter sensor, wherein the multi-parameter sensor is located in a zone of the cargo hold, wherein the multi-parameter sensor is configured to monitor a plurality of conditions of the cargo hold, including heat, smoke, and gas,
    wherein the sensor is initialized based on the cargo parameters, and wherein the controller is configured to modify the initial configuration, including increasing or decreasing sensitivity thresholds to heat, smoke and gas, of the multi-parameter sensor based on the cargo parameters;
    monitoring, via the system controller, the cargo hold storing the cargo based at least in part on the initialized configuration of the multi-parameter sensor; and
    displaying a cargo manifest, the cargo parameters and the location of the sensor on an electronic flight bag from communications with the system controller.

8. The method of claim 7, wherein reading the tag occurs at a position proximate to an entrance of the cargo hold to automatically read the tag as it enters the cargo hold.

9. The method of claim 7, further comprising configuring a plurality of multi-parameter sensors, wherein each of the plurality of multi-parameter sensors is independently configurable from other multi-parameter sensors in the cargo hold.

10. The method of claim 9, wherein the plurality of multi-parameter sensors monitor parameters associated with a heat sensitivity, a smoke sensitivity, or a gas sensitivity.

11. The method of claim 7, wherein the tag is a radio-frequency identification (RFID) tag, wherein the RFID tag is placed on the pallet.

12. The method of claim 7, wherein displaying a cargo manifest includes a tag ID, the cargo type, and hazard definition corresponding to the cargo type.

13. The method of claim 7, wherein a sequence in which a plurality of tags corresponding to respective pallets is read defines a position of the pallets in the cargo hold.

* * * * *